United States Patent [19]
Kunimatsu et al.

[11] Patent Number: 5,423,967
[45] Date of Patent: Jun. 13, 1995

[54] GASEOUS-DIFFUSION ELECTRODE AND ELECTROCHEMICAL REACTOR USING THE SAME

[75] Inventors: Keiji Kunimatsu; Norifumi Hasegawa, both of Sapporo; Nagakazu Furuya, Kofu, all of Japan

[73] Assignee: Technova Inc., Tokyo, Japan

[21] Appl. No.: 91,066

[22] Filed: Jul. 14, 1993

[30] Foreign Application Priority Data

Jul. 16, 1992 [JP] Japan .................. 4-189240

[51] Int. Cl.$^6$ .................. C25B 9/00; C25B 11/00
[52] U.S. Cl. .................. 204/242; 204/290 R; 204/252; 204/283; 204/284; 204/267; 204/253; 204/277; 204/258; 204/265; 204/270; 429/40; 429/41; 429/42; 429/44
[58] Field of Search .................. 204/283, 284, 290 R, 204/252, 242, 267, 270, 265, 253, 258, 265, 277; 429/40, 41, 42, 44

[56] References Cited

U.S. PATENT DOCUMENTS

| | | | |
|---|---|---|---|
| 1,016,874 | 2/1912 | Edison | 429/50 |
| 3,464,860 | 9/1969 | George et al. | 429/57 |
| 4,435,267 | 3/1984 | Batzold et al. | 204/290 R |
| 4,447,508 | 5/1984 | Jensen | 429/57 |
| 4,585,711 | 4/1986 | Vaidyanathan | 429/42 |
| 5,091,819 | 2/1992 | Christiansen et al. | 361/120 |

FOREIGN PATENT DOCUMENTS

| | | |
|---|---|---|
| 1812518 | 12/1968 | Germany . |
| 62-154585 | 7/1987 | Japan . |
| 8100032 | 1/1981 | WIPO . |
| 9010935 | 9/1990 | WIPO . |

OTHER PUBLICATIONS

Shani et al., Solid State Communications, vol. 72, No. 1 (1989), entitled "Evidence for a Background Neutron Enhanced Fusion in Deuterium Absorbed Palladium".

Associated Press, The Washington Post, Mar. 29, 1990, p. A3.

Salamon et al., Nature, vol. 344, Mar. 29, 1990, pp. 401–405.

Chapline, UCRL-101583, Jul. 1989, pp. 1–9, entitled "Cold Confusion".

Stipp, The Wall Street Journal, Apr. 26, 1989, p. 84, entitled "Georgia Group Outlines Errors That Led to Withdrawal of 'Cold Fusion' Claims".

Hilts, The Washington Post, May 2, 1989, pp. A1, A7, entitled "Significant Errors Reported in Utah Fusion Experiments".

Associated Press, The Washington Post, Jul. 13, 1989, p. A14.

Alber et al., Z. Phys. A.–Atomic Nuclei, vol. 333 (1989), pp. 319–320, entitled "Search for Neutrons from 'Cold Nuclear Fusion'" no month available.

Cooke, PRNL/FTR-3341, Jul. 31, 1989, pp. 2–15, entitled "Report of Foreign Travel of J. F. Cooke . . . ".

(List continued on next page.)

*Primary Examiner*—Kathryn Gorgos
*Attorney, Agent, or Firm*—Foley & Lardner

[57] ABSTRACT

There are provided a gaseous-diffusion electrode which can exhibit sufficient gas-supplying ability and gas-discharging ability and an excellent durability even when partly immersed in an electrolysis solution; and an electrochemical reactor using the gaseous-diffusion electrode. A porous membrane 15 which is permeable to gas but not to an electrolysis solution is fixed to the surface of the gaseous-diffusion layer 13 of a gaseous-diffusion electrode 11 obtained by joining a reaction layer 12 supporting a catalyst metal and a gaseous-diffusion layer 13 to each other, so as to cover the surface of the gaseous-diffusion layer 13. When a gas passageway member 17 serving as gas passageway to the gaseous-diffusion layer 13 is inserted between the surface of the gaseous-diffusion layer 13 and the porous membrane 15, the gas-supplying ability and the gas-discharging ability becomes greatly improved. When an electrochemical reactor is composed by immersing the thus composed gaseous-diffusion electrode partly in an electrolysis solution in a pressure vessel composed of a closed vessel, electrolysis or the like can be continuously carried out.

19 Claims, 7 Drawing Sheets

OTHER PUBLICATIONS

Horanyi, J. Radioanal. Nucl. Chem., Letters, vol. 137, No. 1, Aug. 21, 1989, pp. 23–28, entitled "Some Basic Electrochemistry & The Cold Nuclear Fusion of Deuterium".

Faller et al., J. Radioanal. Nucl. Chem. Ltrs., vol. 137, No. 1, Aug. 21, 1989, pp. 9–16, entitled "Investigation of Cold Fusion in Heavy Water".

Hajdas et al., Solid State Communications, vol. 72, No. 4, pp. 309–313, 1989, entitled "Search for Cold–Fusion Events" no month available.

Ziegler et al., Physical Review Letters, vol. 62, No. 25, Jun. 19, 1989, pp. 2929–2932, entitled "Electrochemical Experiments in Cold Nuclear Fusion".

Schrieder et al., Z. Phys. B–Condensed Matter, vol. 76, No. 2, pp. 141–142 (1989) entitled "Search for Cold Nuclear Fusion in Palladium–deuteride" no month available.

Price et al., Physical Review Letters, vol. 63, No. 18, Oct. 30, 1989, pp. 1926–1929, entitled "Search for Energetic–Charged–Particle Emission from Deuterated Ti and Pd Foils".

Cribier et al., Physical Letters B, vol. 228, No. 1, Sep. 7, 1989, pp. 163–166, entitled "Conventional Sources of Fast Neutrons in Cold Fusion Experiments".

The Washington Times, Mar. 24, 1989, p. A5, article by D. Braaten. entitled "test yields claim of energy triumph".

The New York Times, May 3, 1989, pp. A1, A22, article by M. Browne. entitled "'Fusion' Claim is Greeted With Scorn by Physicists".

Kreysa et al., J. Electroanal. Chem., vol. 266, (1989), pp. 437–450, entitled "A critical analysis of electrochemical nuclear fusion experiments" no month available.

Ohashi et al., J. of Nuc. Sci. & Tech., vol. 26, No. 7, (Jul. 1989), pp. 729–732, entitled "Decoding of Thermal Data in Fleischmann & Pons Paper".

Miskelly et al., Science, vol. 246, No. 4931, Nov. 10, 1989, pp. 793–796, entitled "Analysis of the Published Calorimetric Evidence for Electrochemical Fusion of Deuterium in Palladium".

Lewis et al., Nature, vol. 340, Aug. 17, 1989, pp. 525–530, entitled "Searches for low–temperature nuclear fusion of deuterium in palladium".

GASEOUS-DIFFUSION ELECTRODE AND ELECTROCHEMICAL REACTOR USING THE SAME

BACKGROUND OF THE INVENTION

1. Field of the Invention

The present invention relates to a gaseous-diffusion electrode usable for reduction-oxidation of gases and cold fusion, and applicable to fuel cells, secondary cells, electrolytic apparatus, electrochemical synthesis apparatus, etc. and an electrochemical reactor using the gaseous-diffusion electrode.

2. Description of the Related Art

In fuel cells, secondary cells and the like, gaseous-diffusion electrodes have heretofore been usually composed of a gaseous-diffusion layer, a reaction layer and a current-collecting plate.

When used in an electrolytic apparatus, the gaseous-diffusion electrode is composed so that an electrolysis solution and a supplied gas may come into contact with the reaction layer side and the gaseous-diffusion layer side, respectively, of the electrode. In the electrolytic apparatus, the electrolysis solution permeates into the reaction layer, which is hydrophilic, and reaches a catalyst metal supported on the reaction layer. On the other hand, the supplied gas reaches the catalyst metal on the reaction layer via the gaseous-diffusion layer, which is hydrophobic, and an electrochemical reaction is carried out on the reaction layer.

Such a gaseous-diffusion electrode have heretofore been generally known and has been disclosed, for example, in Japanese Patent Application Kokai (Laid-Open) No. 62-154585.

A gaseous-diffusion electrode is required to have a function of receiving a gas from the surface of the gaseous-diffusion layer of the electrode, conducting the gas to the reaction layer of the electrode to subject the same to electrochemical reaction, and discharging the gas produced by the reaction from the gaseous-diffusion layer of the electrode. For this function, it is preferable to keep a large portion of the surface of the gaseous-diffusion layer always in contact with the gas to be received.

In such an electrolytic apparatus as is described above, the gaseous-diffusion layer is in direct contact with the electrolysis solution and hence is attacked by the electrolysis solution, resulting in an insufficient durability of the electrode.

An object of the present invention is to solve the above problems and provide a gaseous-diffusion electrode which exhibits sufficient gaseous reduction-oxidation ability and an excellent durability even when partly immersed in an electrolysis solution.

Another object of the present invention is to provide an electrolytic apparatus most suitable for using the above gaseous-diffusion electrode therein.

SUMMARY OF THE INVENTION

The present invention relates to a gas diffusion electrode comprising a reaction layer supporting a catalyst metal, a gas diffusion layer and a porous material, wherein the porous material covers a part of all of the surface of the gas diffusion layer and is permeable to gas but to an electrolysis solution.

The present invention relates also to the above-mentioned electrode which further has a gas passageway member serving as a passageway of a gas to the gaseous-diffusion layer, on a part or all of the surface of the gaseous-diffusion layer that is reverse to the reaction layer, and in which the porous material covers a part or all of said gas passageway member.

The present invention further relates to electrochemical reactor comprising an electrolytic cell composed of a closed vessel, at least one anode and at least one cathode, wherein the electrode(s) described above are used as the anode(s) and/or the cathode(s).

The present invention still further relates to the above-mentioned electrochemical reactor, wherein an electrolysis solution is accommodated in the electrolytic cell, leaving a space in a part of the inside of the cell, and a part of the anode(s) and a part of the cathode(s) are immersed in the electrolysis solution.

Since the gaseous-diffusion electrode of the present invention is equipped with the porous material which is permeable to gas but not to an electrolysis solution, so as to cover the surface of the gaseous-diffusion layer, a gas-supplying passageway is formed between the surface of the gaseous-diffusion layer and the porous material. Therefore, when the gaseous-diffusion electrode is partly immersed in an electrolysis solution, it is possible to carry out efficiently the supply of a gas from the exposed portion of the porous material above the electrolysis solution to the reaction layer through the gaseous-diffusion layer, or the discharge of a gas produced in the reaction layer from the porous material through the gaseous-diffusion layer.

Furthermore, the gas passageway member according to the present invention is located on the surface of the gaseous-diffusion electrode, and the porous material which is permeable to gas but not to an electrolysis solution is attached to the surface of the gaseous-diffusion layer of the gaseous-diffusion electrode so as to cover the gas passageway member. Therefore, when the gaseous-diffusion electrode is partly immersed in an electrolysis solution, a gas passageway is formed by the gas passageway member. Accordingly, it is possible to carry out efficiently the supply of a gas from the exposed portion of the porous material above the electrolysis solution to the reaction layer through the gaseous-diffusion layer, or the discharge of a gas produced in the reaction layer from the porous material through the gaseous-diffusion layer.

THE PREFERRED EMBODIMENTS OF THE INVENTION

The present invention is described below with reference to the following examples. However, the present invention should not be construed to be limited thereto.

EXAMPLE 1

The electrode of the present invention is explained with reference to the drawings. In Example 1, there is given an example of occlusion of hydrogen in a cathode by ionization of hydrogen gas carried out in a pressure vessel filled with pressurized hydrogen gas by using an alloy capable of occluding hydrogen, as cathode and a gaseous-diffusion electrode as anode. The hydrogen may be $^1H$, $^2H$ or $^3H$.

Figure 1:
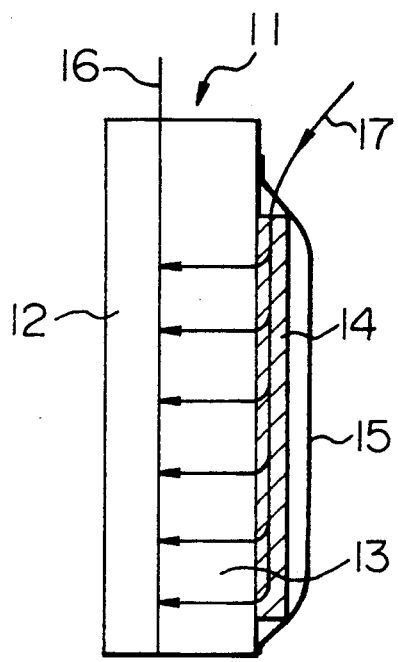
FIG. 1 is a cross-sectional view of a gaseous-diffusion electrode having a water-repellent porous material fixed thereto of the present invention.
Figure 2:
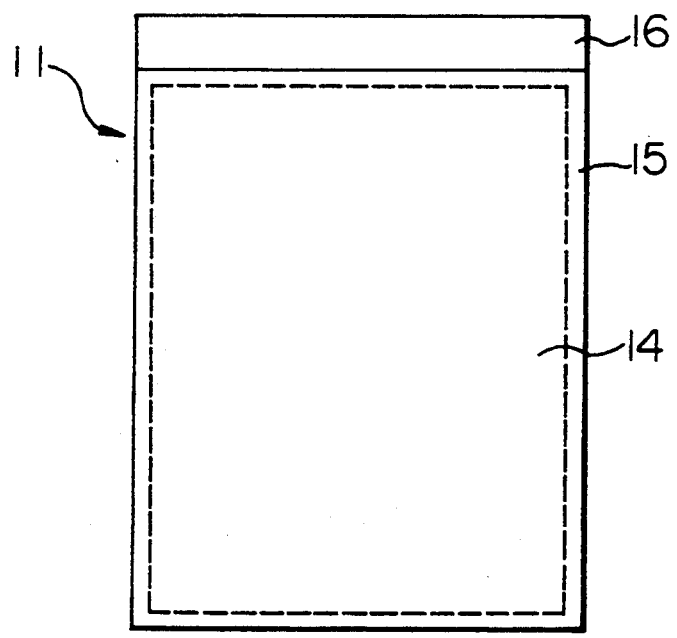
FIG. 2 is a front view of the gaseous-diffusion electrode having a water-repellent porous material fixed thereto of the present invention.

FIG. 1 is a cross-sectional view of a gaseous-diffusion electrode having a water-repellent porous material fixed thereto of the present invention. FIG. 2 is a front view of this gaseous-diffusion electrode. Numeral 11 shows the gaseous-diffusion electrode which has a dual structure formed by joining of a reaction layer 12 and a gaseous-diffusion layer 13 to each other. A gas passageway member 14 is located on the surface of the gaseous-diffusion layer 13. In addition, a water-repellent porous material 15 is fixed at the whole periphery of the surface of the gaseous-diffusion layer 13 so as to envelop the gas passageway member 14 and cover substantially the whole surface of the gaseous-diffusion layer 13.

Gaseous-diffusion electrode

Several milligrams (for example 0.5 mg) of platinum fine particles having an average particle size of 2 to 10 mm are supported on hydrophobic carbon black having an average particle size of 450 Å. Polytetrafluroethylene PTFE (a polytetrafluoroethylene) having an average particle size of 0.3 μm is blended with the thus treated carbon black in a proportion of 10 to 20% by weight based on the weight of the treated carbon black. The supporting of platinum may be carried out in such a way that a mixture of carbon black and PTFE is press molded, then coated with a solution of chloroplatinic acid and the resulting composition is dried. The resulting composition is formed into a layer with a thickness of 0.1 mm, a width of 120 mm and a length of 120 mm, whereby the reaction layer 12 is obtained. The reaction layer 12 has fine hydrophilic portions and fine hydrophobic portions because of the carbon black and PTFE mixed with each other.

Next, a composition obtained by blending hydrophobic carbon black having an average particle size of 420 Å and PTFE having an average particle size of 0.3 μm in a ratio of 7:3 is formed into a layer of 0.5 mm in thickness, whereby the gaseous-diffusion layer 13 is obtained.

The gaseous-diffusion electrode 11 is produced by joining the reaction layer 12 and the gaseous-diffusion layer 13 to each other with a current collector 16 between by hot melt.

The gaseous-diffusion electrode 11 is used as at least either an anode or a cathode.

Porous material

As the porous material 15, there is preferably used a porous membrane, in particular, a water-repellent porous membrane which is permeable to gas but not to an electrolysis solution.

As a material for the water-repellent porous membrane 15, a membrane filter made of PTFE capable of repelling liquids having a high surface tension, such as water and acids is suitable. The size of pores of the porous membrane 15 is such that an electrolysis solution does not permeate the membrane. The thickness of the membrane is not critical.

As the membrane filter made of PTFE, there can be used, for example, Fluoropore R Membrane Filter FR-010 (a trade name, mfd. by Flon Industry, Co., Ltd.; average pore diameter 0.1 μm, thickness 60 μm).

The porous material 15 is fixed for imparting water repellency and durability to the surface of the gaseous-diffusion electrode 11.

The porous material is fixed to the surface of gaseous-diffusion electrode 11 so as to cover the whole surface of the gaseous-diffusion layer 13. Since the place of fixing is the whole periphery of the surface of the gaseous-diffusion layer 13, no electrolysis solution intrudes into the internal space covered with the porous material 15 but gas can go in and go out of the space freely.

Gas passageway member

For supplying a gas as much as possible to the reaction layer 12 through the gaseous-diffusion layer 13 of the gaseous-diffusion electrode 11, it is preferable to locate the gas passageway member 14 between the gaseous-diffusion layer 13 and the water-repellent porous membrane 15. The gas passageway member 14 fulfills its function as a gas passageway 17 which enable the gas to permeate into the inner part of the passageway freely and reach the gaseous-diffusion layer 13. As such a gas passageway member 14, porous carbon paper is suitable because of its excellent corrosion resistance.

As the carbon paper, Carbon Paper E-704 (a tradename, a carbon binder mfd. by Kureha Chemical Industry Co., Ltd.; thickness 0.30 mm) can be used.

Fixing of the porous material to the gaseous-diffusion electrode

The gas passageway member 14 is located between the porous material 15 and gaseous-diffusion layer 13 for the purpose of securing the gas passageway 17 on the surface of the gaseous-diffusion layer 13. When a part of the gaseous-diffusion electrode having the gas passageway 17 is immersed in an electrolysis solution, a gas is certainly supplied to the surface of the gaseous-diffusion layer 13 through the gas passageway 17 even if the porous membrane 15 is brought into close contact with the gaseous-diffusion electrode 11 by hydraulic pressure. Therefore, electrolysis reaction is efficiently carried out by the supply of the gas from the gaseous-diffusion layer 13 to the reaction layer 12. Accordingly, a high current density can be attained at a low overvoltage.

The above-mentioned water-repellent porous membrane 15 and gas passageway member 14 can be fixed to the gaseous-diffusion electrode 11 by covering the surface of the gaseous-diffusion layer 13 with the water-repellent porous membrane 15 so as to hold the gas passageway member between the surface of the layer 13 and the membrane 15, and carrying out thermocompression bonding of the hem of the porous membrane.

For example, a membrane filter made of PTFE (Fluoropore R Membrane Filter FR-010, a trade name, mfd. by Flon Industry, Co., Ltd.; average pore diameter 0.1 μm, thickness 60 μm) is fixed by thermocompression bonding at 300° C. while holding carbon paper having a thickness of 0.3 mm (Carbon Paper E-704, a trade name, a carbon binder mfd. by Kureha Chemical Industry Co., Ltd.) between the surface of the gaseous-diffusion layer 13 and the porous membrane 15.

Constitution of a cathode

As an cathode 22, a metal capable of occluding hydrogen can be used. In Example 1, palladium (diameter 1 mm, thickness 35 mm) is used as alloy capable of occluding hydrogen.

Constitution of the whole of an electrochemical reactor

Figure 3:
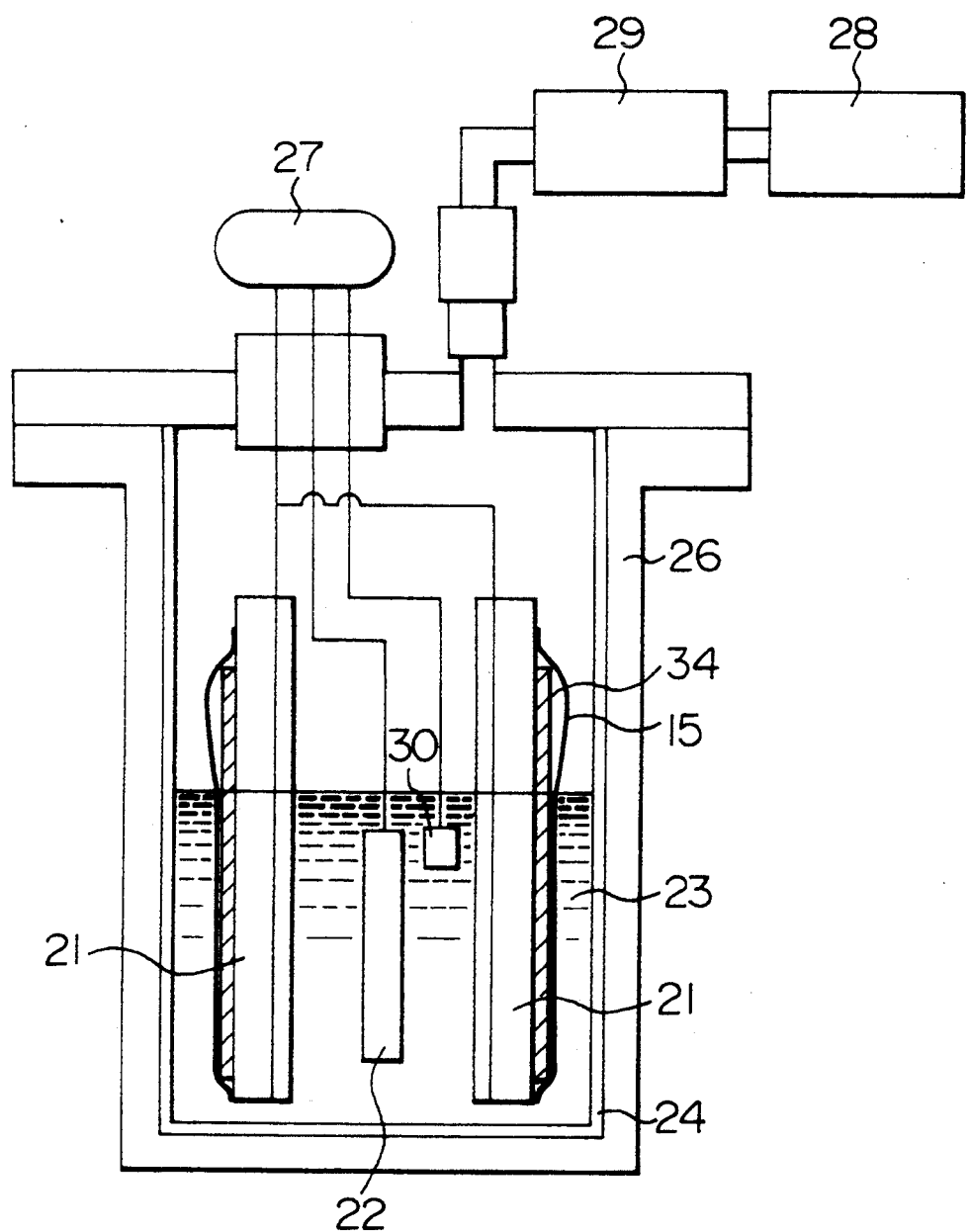
FIG. 3 is a general view of an electrolytic apparatus of the resent invention.

FIG. 3 is a general view of an electrochemical reactor of Example 1. The constitution of this apparatus and electrolysis using the apparatus are explained below.

Numeral 26 shows an electrolytic cell. The electrolytic cell may be an open vessel or a closed vessel such as a pressure vessel which can be hermetically sealed. In the present example, there was used the pressure vessel which can be hermetically sealed. The inner wall of the pressure vessel 26 has a corrosion-resistant coating 24. As a corrosion-resistant material for this coating, PTFE was used in Example 1, though coating with a metal having resistance to corrosion due to an electrolysis solution 23 by plating or the like was also possible. The electrolysis solution 23 is accommodated in the pressure vessel 26, leaving a space in the upper part. The space in the upper part is filled with hydrogen gas. The whole of the cathode 22 composed of a metal capable of occluding hydrogen (e.g. palladium) is immersed in the electrolysis solution 23. On the other hand, a part of an anode composed of the gaseous-diffusion electrode obtained by fixing the water-repellent porous membrane 15 so as to hold carbon paper 34 between the porous membrane 15 and the gaseous-diffusion layer 13 is immersed in the electrolysis solution 23. In this example, the area of exposed portion of the anode 21 in the hydrogen gas was 16 cm², and the area of the portion immersed in the electrolysis solution 23 was 20 cm².

Numeral 30 shows a reference electrode (RHE), which is located near the anode 21 in the electrolysis solution 23 for measuring the overvoltage of ionization reaction of the hydrogen gas in the anode 21.

A potentiostat 27 is connected to the anode 21 and the cathode 22 as an external electric source. Hydrogen gas to be introduced into the pressure vessel 26 is passed through a hydrogen gas supplying unit 28 and a gas controlling unit 29 next thereto outside the pressure vessel 26, whereby the gas pressure is adjusted. The thus treated hydrogen gas is introduced into the pressure vessel 26.

In the above-mentioned apparatus for electrolysis of water in which the space in the upper part is filled with pressurized hydrogen gas, the hydrogen gas intrudes into the exposed portion of the porous membrane 15 fixed to the gaseous-diffusion electrode in the pressurized hydrogen gas atmosphere, passes through the porous structure of the carbon paper 34 and reaches the gaseous-diffusion layer. Therefore, the hydrogen gas is uniformly supplied to the gaseous-diffusion layer which is in contact with the carbon paper 34.

Then, the hydrogen gas reaches the catalyst portion of the reaction layer from the gaseous-diffusion layer and comes into contact with the electrolysis solution 23 to be ionized into H$^+$ ions. Thus, the gaseous-diffusion electrode partly immersed in the electrolysis solution 23 functions as the anode 21 sufficiently. On the other hand, H$_2$ gas is produced in the cathode 2 composed of a metal capable of occluding hydrogen (e.g. palladium), and returns to the gas layer in the space in the upper part in the pressure vessel 26. Water evaporated in the pressure vessel 26 is condensed and then returns to the electrolysis solution 23 in the pressure vessel 26. Therefore, the electrolysis solution 23 is not decreased.

An example of electrolysis using the above electrolytic apparatus is explained with reference to FIG. 4.

As an electrolysis solution, 1M LiOH was used, and the hydrogen gas pressure in the pressure vessel was adjusted to 6.0 kgf/cm². Controlled current electrolysis was carried out using a potentiostat.

The following three electrodes each having a gaseous-diffusion electrode were used: a gaseous-diffusion electrode having no porous membrane fixed thereto (shown by the symbol ① in FIG. 4) was used as an electrode of a comparative example; a gaseous-diffusion electrode having a porous membrane fixed thereto without a carbon paper inserted between the gaseous-diffusion layer and the porous membrane (shown by the symbol ② in FIG. 4) was used as an electrode of the present invention; and a gaseous-diffusion electrode having a porous membrane fixed thereto with a carbon paper inserted between the gaseous-diffusion layer and the porous membrane (shown by the symbol ③ in FIG. 4) was used as another electrode of the present invention. For the three gaseous-diffusion electrodes, the gas-supplying ability for hydrogen gas was measured.

Figure 4:
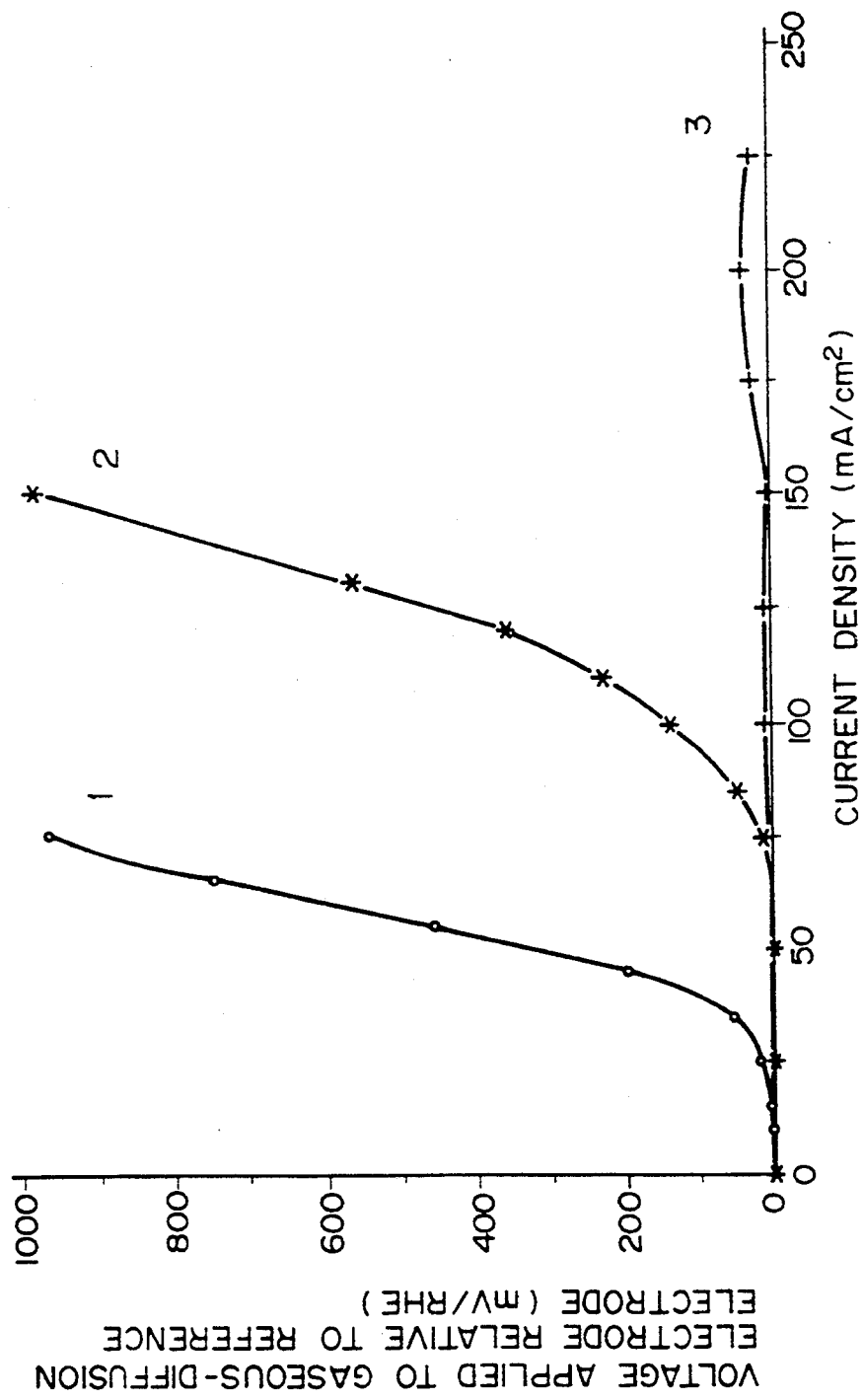
FIG. 4 shows relationships between voltage (mV) applied to a reference electrode and current density ($mA/cm^2$) which were determined at a hydrogen pressure of 6.0 $kgf/cm^2$ for three electrodes each having a gaseous-diffusion electrode, i.e., an electrode of a comparative example (①), an electrode of the present invention (②) an another electrode of the present invention (③).

FIG. 4 shows relationships between voltage (mV) applied to the gaseous-diffusion electrode and current density (mA/cm²) which were determined for the above three gaseous-diffusion electrodes, respectively, relative to the reference electrode at a hydrogen gas pressure of 6.0 kgf/cm².

Figure 5:
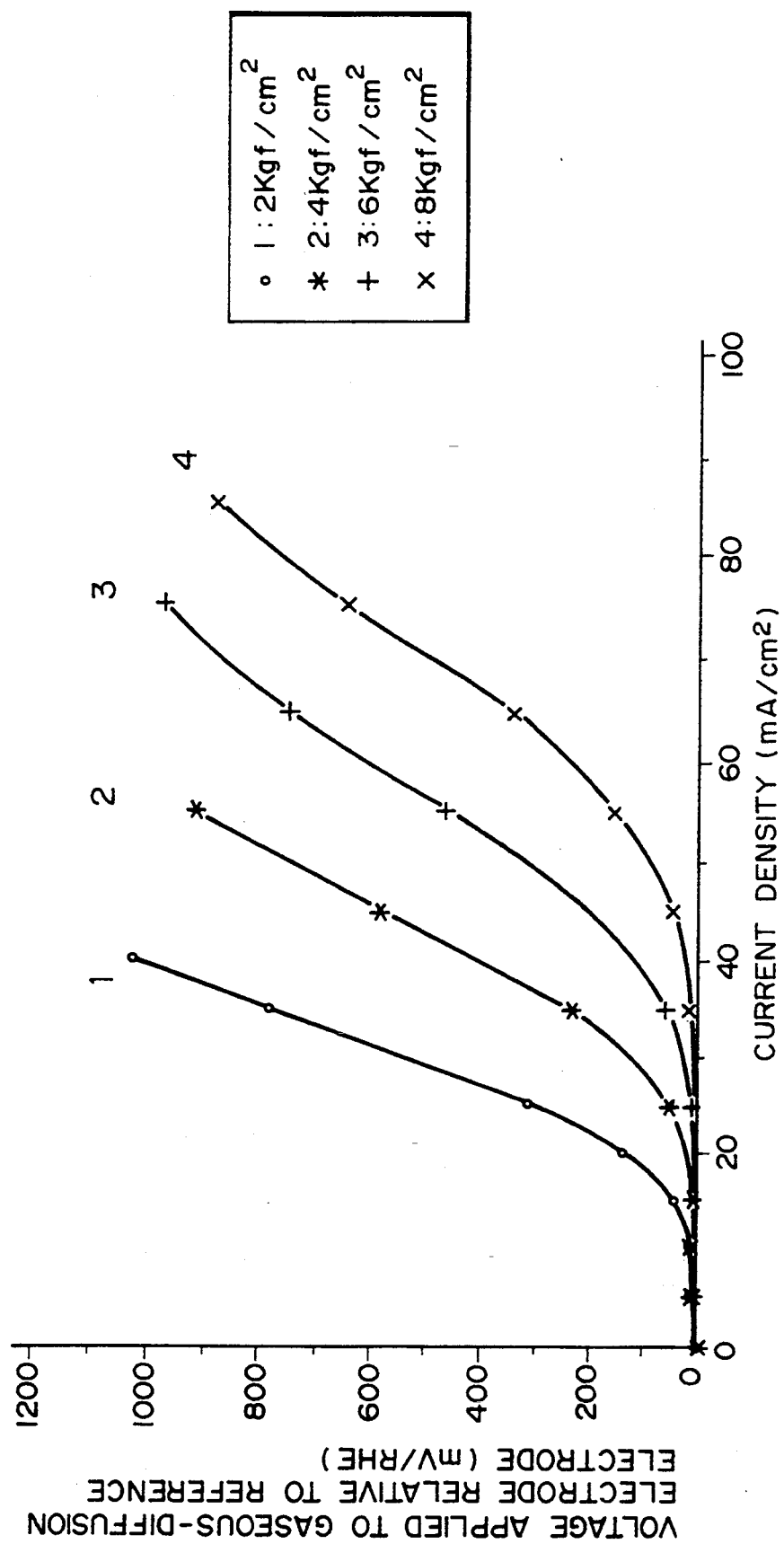
FIG. 5 shows relationships between voltage (mV) applied to a reference electrode and current density ($mA/cm^2$) which were determined for the electrode ①.
Figure 6:
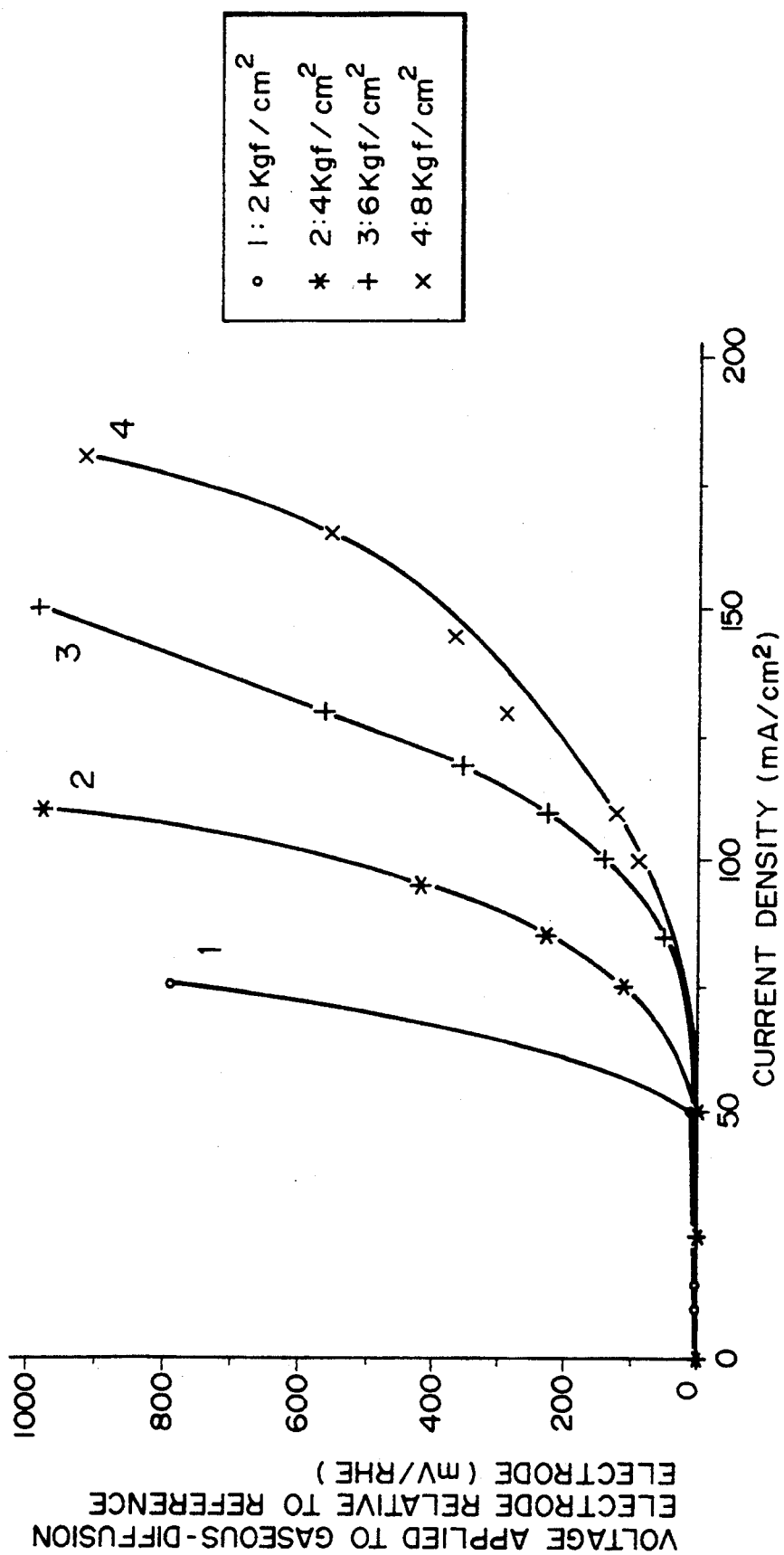
FIG. 6 shows relationships between voltage (mV) applied to a reference electrode and current density ($mA/cm^2$) which were determined for the electrode ②.
Figure 7:
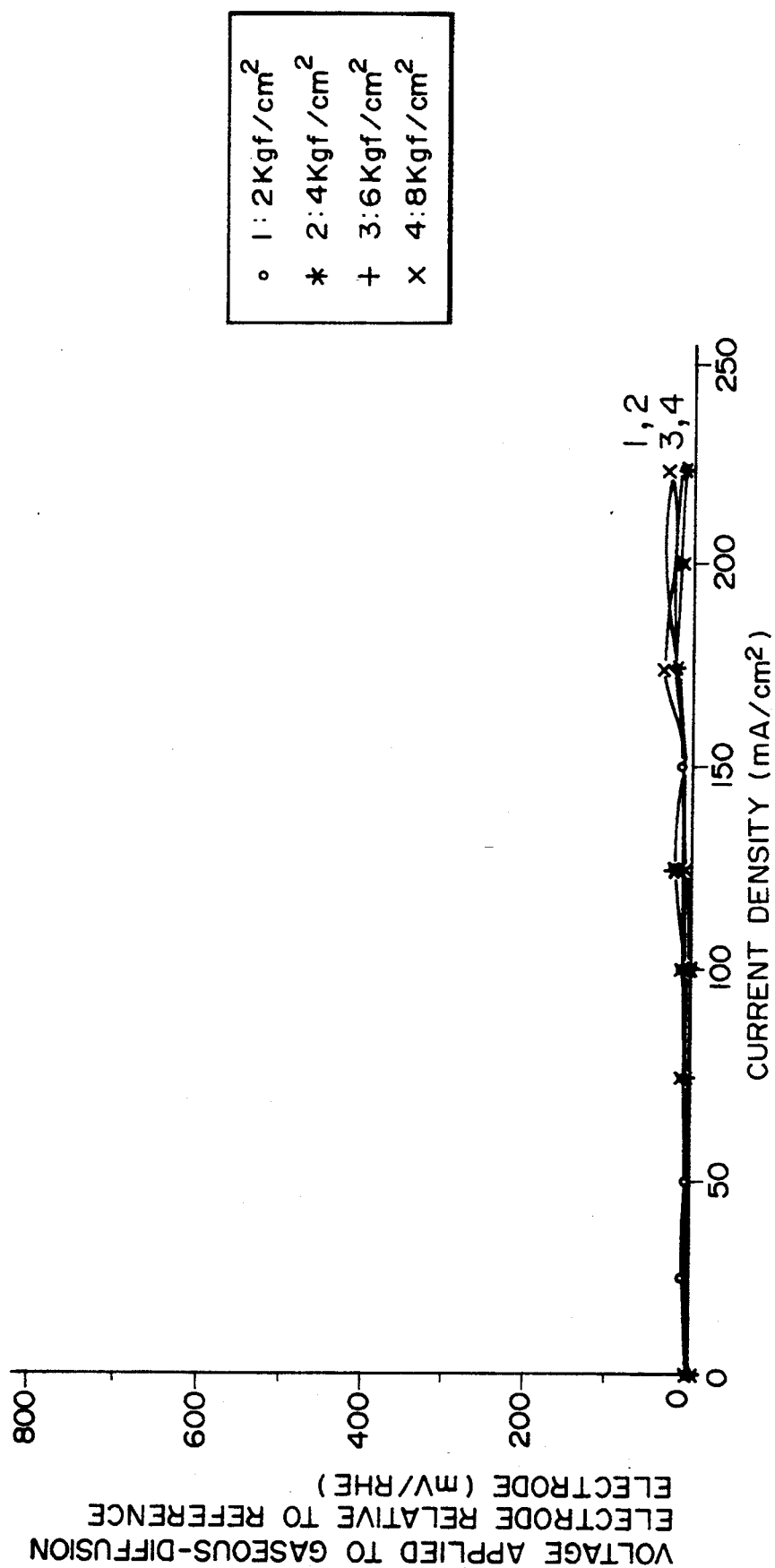
FIG. 7 shows relationships between voltage (mV) applied to a reference electrode and current density ($mA/cm_2$) which were determined for the electrode ③.

Next, the gas-supplying ability for hydrogen gas of each of the above electrode ①, electrode ② and electrode ③ was measured at each of hydrogen pressures of 2 kgf/cm², 4 kgf/cm², 6 kgf/cm², and 8 kgf/cm². FIG. 5 shows relationships between voltage (mV) applied to the reference electrode and current density (mA/cm²) in the case where the electrode e,crc/1/ was used. FIG. 6 shows relationships between voltage (mV) applied to the reference electrode and current density (mA/cm²) in the case where the electrode ② was used. FIG. 7 shows relationships between voltage (mV) applied to the reference electrode and current density (mA/cm²) in the case where the electrode ③ was used.

From FIGS. 5 to 7, it can be seen that when the employment of the electrode ① (FIG. 5) and the employment of the electrode ② (FIG. 6) are compared, the electrode ② having a porous membrane fixed thereto gives a higher current density at the same applied voltage. However, it can also be seen that in the case of both the electrode ① and the electrode ②, the higher the hydrogen gas pressure, the higher the current density, and that therefore no sufficient gas-supplying ability can be attained unless the hydrogen gas pressure is increased.

On the other hand, the following can be seen: when the electrode ③ was used (FIG. 7), a sufficient current density (about 200 mA/cm²) can be attained at a low applied voltage and the current density is hardly affected by the external pressure. Therefore, the performance characteristics of the gaseous-diffusion electrode can be greatly improved by inserting carbon paper between the surface of gaseous-diffusion layer of the gaseous-diffusion electrode and the porous membrane.

In the electrode of the present invention, the water-repellent porous material which is permeable to gas but not to an electrolysis solution is fixed at the whole periphery of the surface of the gaseous-diffusion electrode so as to cover the surface of the gaseous-diffusion layer, and moreover carbon paper is inserted between the gaseous-diffusion electrode and the PTFE membrane. Therefore, even when partly immersed in an electrolysis solution, the gaseous-diffusion electrode can exhibit sufficient gas-supplying ability and gas-discharging ability.

Furthermore, since the gaseous-diffusion layer of the gaseous-diffusion electrode is not in direct contact with an electrolysis solution, the gaseous-diffusion electrode is excellent in durability.

In the electrolytic apparatus according to the present invention, the pressure vessel is used as it is as an electrolytic bath accommodating an electrolysis solution. Therefore, even when the electrolysis solution undergoes repeated evaporation and condensation, the anode and the cathode are always immersed in the electrolysis solution without cease because the electrolysis solution is circulated. Accordingly, electrolysis can be continuously carried out.

EXAMPLE 2

Figure 8:
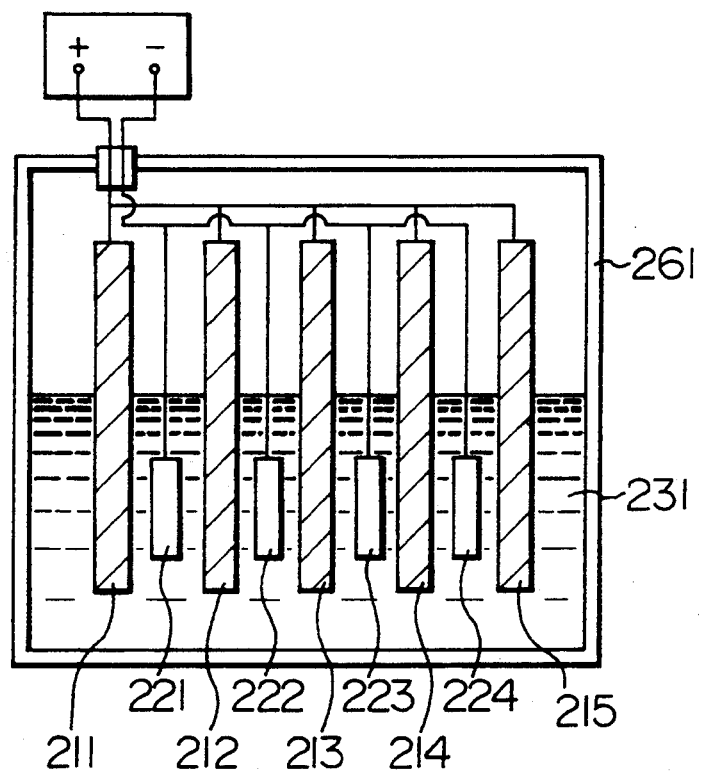
FIG. 8 shows an example of integrated electrolytic apparatus.

FIG. 8 shows an example of electrolytic apparatus obtained by setting a plurality of electrodes in the same pressure vessel as used in Example 1, in other words, an example of integrated electrolytic apparatus.

An electrolysis solution 231 is accommodated in the pressure vessel 261, leaving a space in the upper part. The space in the upper part is filled with a gas to be supplied. A plurality of gaseous-diffusion electrodes 211, 212, 213, 214 and 215 having a water-repellent porous membrane fixed thereto are set as anodes in the electrolysis solution 231 in a partly immersed state. Cathodes 221, 222, 223 and 224 are immersed in the electrolysis solution between the gaseous-diffusion electrodes 211 and 212, 212 and 213, 213 and 214, and 214 and 215, respectively.

Since a plurality of the gas diffusion electrodes of the present invention can be set in one electrolytic bath without deteriorating the performance characteristics of the electrodes, the effects of the integration, such as an increase of the electrolytic capacity are brought about.

An electrolytic apparatus having such a constitution permits integration without deterioration of the performance characteristics of the electrodes. Therefore, when the electrolytic apparatus is composed as a fuel cell, it becomes possible to increase the output current per unit by virtue of the effects of the integration.

What is claimed is:

1. A gas diffusion electrode comprising a reaction layer supporting a catalyst metal, a gas diffusion layer and a porous material, wherein the porous material covers a part or all of the surface of the gas diffusion layer and is permeable to gas but not to an electrolysis solution.

2. A gas diffusion electrode according to claim 1, further comprising a current collector.

3. A gas diffusion electrode according to claim 2, wherein said current collector is connected with at least one selected from the group consisting of said reaction layer and said gas diffusion layer.

4. A gas diffusion electrode according to claim 2, further comprising a gas passageway member serving as a passageway of a gas to the gas diffusion layer between said gas diffusion layer and said porous material.

5. An electrochemical reactor comprising an electrolyte cell composed of a closed vessel, at least one anode and at least one cathode, wherein at least one gas diffusion electrode according to claim 4 is used as at least one selected from the group consisting of said anode and said cathode.

6. An electrochemical reactor according to claim 5, wherein an electrolysis solution is accommodated in the electrolytic cell, leaving a space in a part of the inside of the cell, and a part of the at least one anode and a part of the at least one cathode are immersed in the electrolysis solution.

7. An electrochemical reactor according to claim 6, wherein the porous material is a porous membrane.

8. An electrochemical reactor comprising an electrolyte cell composed of a closed vessel, at least one anode and at least one cathode, wherein at least one gas diffusion electrode according to claim 2 is used as at least one selected from the group consisting of said anode and said cathode.

9. An electrochemical reactor according to claim 8, wherein an electrolysis solution is accommodated in the electrolytic cell, leaving a space in a part of the inside of the cell, and a part of the at least one anode and a part of the at least one cathode are immersed in the electrolysis solution.

10. An electrochemical reactor according to claim 9, wherein the porous material is a porous membrane.

11. A gas diffusion electrode according to claim 1, further comprising a gas passageway member serving as a passageway of a gas to the gas diffusion layer between said gas diffusion layer and said porous material.

12. An electrochemical reactor comprising an electrolyte cell composed of a closed vessel, at least one anode and at least one cathode, wherein at least one gas diffusion electrode according to claim 11 is used as at least one selected from the group consisting of said anode and said cathode.

13. An electrochemical reactor according to claim 12, wherein an electrolysis solution is accommodated in the electrolytic cell, leaving a space in a part of the inside of the cell, and a part of the at least one anode and a part of the at least one cathode are immersed in the electrolysis solution.

14. An electrochemical reactor according to claim 13, wherein the porous material is a porous membrane.

15. An electrochemical reactor according to claim 13, which has a plurality of the anodes or the cathodes.

16. An electrochemical reactor comprising an electrolyte cell composed of a closed vessel, at least one anode and at least one cathode, wherein at least one gas diffusion electrode according to claim 1 is used as at least one selected from the group consisting of said anode and said cathode.

17. An electrochemical reactor according to claim 16, wherein an electrolysis solution is accommodated in the electrolytic cell, leaving a space in a part of the inside of the cell, and a part of the at least one anode and a part of the at least one cathode are immersed in the electrolysis solution.

18. An electrochemical reactor according to claim 17, wherein the porous material is a porous membrane.

19. An electrochemical reactor according to claim 17, which has a plurality of the anodes or the cathodes or both.

* * * * *